(12) United States Patent
Schiestel et al.

(10) Patent No.: US 6,830,694 B2
(45) Date of Patent: Dec. 14, 2004

(54) METHOD FOR SEPARATING COMPONENTS FROM LIQUID AND GASEOUS MEDIA WITH NANOCOMPOSITES

(75) Inventors: Thomas Schiestel, Stuttgart (DE); Thomas Mueller, Neunkirchen/Saar (DE); Hermann Schirra, Saarbruecken (DE); Helmut Schmidt, Saarbruecken-Guedingen (DE)

(73) Assignee: Institut fuer Neue Materialien gemeinnuetzige GmbH, Saarbruecken (DE)

( * ) Notice: Subject to any disclaimer, the term of this patent is extended or adjusted under 35 U.S.C. 154(b) by 144 days.

(21) Appl. No.: 10/221,300

(22) PCT Filed: Mar. 19, 2001

(86) PCT No.: PCT/EP01/03129

§ 371 (c)(1),
(2), (4) Date: Sep. 9, 2002

(87) PCT Pub. No.: WO01/70365

PCT Pub. Date: Sep. 27, 2001

(65) Prior Publication Data

US 2003/0038083 A1 Feb. 27, 2003

(30) Foreign Application Priority Data

Mar. 20, 2000 (DE) .......................................... 100 13 670

(51) Int. Cl.⁷ ............................. C02F 11/28; C02F 1/48
(52) U.S. Cl. .......................... 210/660; 95/90; 210/661; 210/695; 252/62.51; 252/62.56; 264/109; 264/118; 427/127; 436/526

(58) Field of Search .................................. 210/660, 661, 210/679, 691, 695; 428/402, 402.2, 402.24, 403–405; 427/127; 523/300; 252/62.51, 62, 56; 264/109, 118; 95/90; 436/525–527

(56) References Cited

U.S. PATENT DOCUMENTS

| | | | |
|---|---|---|---|
| 4,319,893 A | 3/1982 | Hatch et al. | |
| 4,554,088 A | 11/1985 | Whitehead et al. | |
| 5,397,476 A | 3/1995 | Bradbury et al. | |
| 5,759,793 A * | 6/1998 | Schwartz et al. | 435/7.24 |
| 5,889,091 A * | 3/1999 | Ziolo et al. | 523/300 |
| 5,945,525 A | 8/1999 | Uematsu et al. | |
| 6,183,658 B1 * | 2/2001 | Lesniak et al. | 252/62.56 |
| 6,548,264 B1 * | 4/2003 | Tan et al. | 435/7.21 |

FOREIGN PATENT DOCUMENTS

| | | |
|---|---|---|
| DE | 4307262 | 9/1994 |
| DE | 19614136 | 10/1997 |
| EP | 0522856 | 1/1993 |
| EP | 0757106 | 2/1997 |

OTHER PUBLICATIONS

English Language Abstract of DE No. 4307262.

\* cited by examiner

Primary Examiner—Joseph Drodge
(74) Attorney, Agent, or Firm—Greenblum & Bernstein, P.L.C.

(57) ABSTRACT

Components are separated from liquid or gaseous media with the aid of a nanocomposite comprising nanoparticles in a matrix, wherein the liquid or gaseous medium is brought into contact with the nanocomposite in such a way that at least part of the components to be separated off is bound to the nanocomposite and the resulting laden nanocomposite is separated from the liquid or gaseous medium.

40 Claims, No Drawings

METHOD FOR SEPARATING COMPONENTS FROM LIQUID AND GASEOUS MEDIA WITH NANOCOMPOSITES

CROSS-REFERENCE TO RELATED APPLICATIONS

This application is a 371 of PCT/EP01/03129.

The present application is a U.S. National Stage of International Application No. PCT/EP01/03129, filed Mar. 19, 2001, which claims priority under 35 U.S.C. § 119 of German Patent Application No. 100 13 670.2, filed Mar. 20, 2000.

BACKGROUND OF THE INVENTION

The invention relates to a process for separating components from liquid and gaseous media using nanocomposites and also to a process for producing the nanocomposites.

Molecular or macromolecular components are generally separated from solutions and from the gas phase by absorption processes and/or by chemical bonding of the molecular or macromolecular components to the surface of a solid. These components occasionally also react with the surface. However, these processes are usually not reversible.

To maintain a cost-effective process, the surfaces are generally regenerated. If this cannot be carried out (e.g. in various cases in which activated carbon is used), then the entire adsorbent-adsorbate system has to be disposed of. A problem which occurs in all adsorption processes from gas and liquid phases and is difficult to solve physically is the fact that as the surface area increases (increase in the adsorption capacity) the flow resistance of beds or fixed beds increases by several orders of magnitude as a function of the particle size. This is particularly problematical in fluidized beds. This has a very severe adverse effect on the effectiveness of adsorber beds. A remedy would be to keep very small particles in suspension. However, these have to be filtered off again, and the problem of low liquid throughput is merely shifted from the adsorption step to the filtration step, but is not solved.

It is an object of the invention to find materials and processes which do not have the abovementioned technical drawbacks.

An interesting approach is to employ magnetizeable and/ or magnetic particles which are kept in suspension for the adsorption of particular components and then to separate these from the reaction medium (liquid or gas phase to be purified) by application of a magnetic field. An important aspect is the adsorption selectivity of surfaces. This is generally only achieved in a group-specific manner in the case of adsorption media, i.e. a chemical family having similar functionality is generally always adsorbed on a particular surface. Provision of typical adsorbents, e.g. activated carbon or aluminum hydroxide, with selective functions is difficult, since the attachment of such groups to these absorption media is only possible in a few cases in industry. Use is therefore made of less selective methods, e.g. making surfaces hydrophobic or hydrophilic, or attempts are made to influence the acidic or basic character of, for example, aluminum oxides and the loading of the adsorption sites by means of doping.

Magnetic precipitation of magnetic particles is achieved by coating mica platelets with iron oxides and depositing a glass layer which is capable of more or less selectively adsorbing particular biochemical components on these platelets. However, this is a relatively unselective process and is not suitable for the separation of relatively small molecules from liquids and gases. Only macromolecules which have an appropriate surface charge are adsorbed.

Magnetic particles have to have sizes in the nanometer range if they are not to display permanent magnetism. Permanent magnetism after a magnetic field is switched off would lead to aggregation by mutual interaction between the particles. The particle size is therefore preferably <20 nm in order to achieve superparamagnetic behavior (single domain structures).

SUMMARY OF THE INVENTION

The object of the invention is achieved by producing superparamagnetic nanoparticles as are described in the German Patent Application 19614136. To prevent irreversible aggregation, these particles are coated with functional groups, e.g. amines, amino groups or carboxylate groups. Since amino groups are good complexing agents for transition metals, it is in principle possible to employ such particles for binding transition metal ions in aqueous solutions.

However, separation by means of a magnetic field is incomplete because of the small size of the particles and the associated Brownian motion, so that relatively large amounts of the particles are always entrained in a flowing medium. The object was able to be achieved by dispersing the nanoparticles in a liquid or dissolved matrix phase and producing relatively large particles having desired diameters from this matrix phase. The diameter of these particles is in the range from 0.1 to 1,000 $\mu$m, but preferably in the range from 1 to 500 $\mu$m and particularly preferably in the range from 50 to 300 $\mu$m.

The particles can be produced by introducing the liquid matrix phase into an immiscible solvent and producing an emulsion having the correct size range by means of a mechanical mixing process (e.g. Ultraturrax stirrer). This method allows the abovementioned particle sizes to be produced. During the introduction of mechanical energy, which can be supplemented by ultrasound, a solidification reaction according to customary principles takes place. This can be a polymerization reaction, a precipitation reaction, an addition reaction or a polycondensation reaction. The preferred type of reaction depends on the matrix system which can be produced from alkoxides (sol-gel process) but also from organic monomers, oligomers or dissolved phases. In addition, functional groups can be incorporated in this matrix, e.g. by use of functional silanes or functional double-bond-molecules. This matrix functionalization, which also functionalizes the surfaces of the nanocomposite particles, can be used to generate reaction selectivity (e.g. complex formation with heavy metals). Another variant of the process is subsequent surface modification, e.g. by silanization of sol-gel nanocomposite particles.

Such nanocomposite particles make it possible to produce suspensions in aqueous or organic solvents. However, they are also suitable for fluidized-bed processes in the gas phase. Appropriate choice of the functional groups on the surface makes it possible to separate off both ionic components and components which can be bound by complex formation as well as biological and biochemical components when appropriate functional groups (antibodies, antigens, proteins or the like) are bound to the surface. The boundary conditions are selected so that the components are bound, for example, in pH ranges in which the association constant of complex formation is very low. After the particles have been laden with the components to be removed, which can be accelerated by stirring, a magnetic field is switched on so as to attach the particles to the wall or to a device which is introduced into the suspension. This device is then removed together with the collected particles and the bound components are eluted in a regeneration step, after which the nanocomposite particles are once again separated off magnetically and are then available for a further purification procedure. Such processes can also be operated continuously when suitable plants are used. Gas-phase purification in a fluidized bed is carried out analogously.

The novel process described can thus be employed for a large number of purification processes from solutions.

DETAILED DESCRIPTION OF AN EMBODIMENT OF THE INVENTION

The nanoparticles are preferably produced as described in DE-A-19614136 via a precipitation process in which the nanoparticles are subsequently coated under the action of ultrasound. The process disclosed in DE-A-19614136 for producing agglomerate-free nanosize iron oxide particles having a hydrolysis-resistant coating and the compounds mentioned therein for the production of these particles are hereby expressly incorporated by reference. This coating of the nanoparticles can be carried out using various components, and can be carried out in aqueous or nonaqueous solutions. In this way it is possible to produce, for example, hydrophobic coatings or hydrophilic coatings which are in turn necessary for good dispersibility in the matrix in question. As matrix, it is possible to employ sol-gel systems which are prepared from alkoxides and organoalkoxysilanes. Examples are silicic esters, organoalkoxysilanes, alkoxides of the elements of the third and fourth main groups of the Periodic Table, and also alkoxides of boron and of phosphorus. However, alkoxides or elements of the second main group can be additionally employed, as can alkoxides of the transition metals and subgroup elements. The nanoparticles, in particular the iron oxide nanoparticles, are dispersed in the appropriate reaction mixtures and are subsequently converted into an emulsion by the abovementioned process.

In the case of alkoxides, it is generally sufficient to add small amounts of water, if desired with addition of small amounts of acid, in order to induce condensation and obtain solid particles. In the case of organic systems, the particles are preferably hydrophobicized or provided with surface modifiers which prevent the particles from agglomerating as a result of their compatibility with the liquid matrix. The solidification of organic matrices can be achieved by means of polymerization processes in which customary polymerization catalysts are mixed in and thermal or UV polymerization is carried out while the microemulsion is stable.

The addition of functional molecules to the matrix, e.g. appropriate organoalkoxysilanes bearing functional groups (acids, bases, amines, chelating ligands, etc) enables selectivity of the matrix on the particle surface to be generated. A further method is to couple selectively binding components onto the matrix. Suitable components for this purpose are likewise, for example, chelating ligands but also biochemical molecules which function according to the lock-and-key principle, e.g. antigens, antibodies or proteins. The customary coupling reactions described in the literature are used for this purpose. After production of the particles, the solvent is taken off while stirring and the residue, if it has solidified, is, if necessary, brought to the desired particle size by mechanical comminution processes. For drying, it is also possible to use agitated drying equipment such as fluidized-bed reactors, fluidized-bed dryers or tritube ovens. An alternative to taking off the solvent is separating off the particles by centrifugation, decantation, filtration and subsequent drying.

What is claimed is:

1. A process for separating a component from a liquid or gaseous medium, comprising:
    (a) contacting the liquid or gaseous medium with a nanocomposite which comprises a solid matrix, formed by solidifying of a liquid matrix-forming material, and a plurality of nanoparticles dispersed therein so that at least part of the component to be separated is bound to the nanocomposite, forming a laden nanocomposite; and
    (b) separating the laden nanocomposite from the liquid or gaseous medium.

2. The process of claim 1, wherein the nanocomposite is in particulate form.

3. The process of claim 2, wherein the particulate nanocomposite has a particle size of from 0.1 $\mu$m to 1,000 $\mu$m.

4. The process of claim 3, wherein the particle size is from 1 $\mu$m to 500 $\mu$m.

5. The process of claim 3, wherein the particle size is from 50 $\mu$m to 300 $\mu$m.

6. The process of claim 2, wherein the liquid medium comprises an aqueous phase and the particulate nanocomposite is dispersed therein.

7. The process of claim 2, wherein the particulate nanocomposite is part of a fluidized bed.

8. The process of claim 1, wherein the nanocomposite comprises nanoparticles having a particle size of less than 20 nm.

9. The process of claim 1, wherein the nanocomposite comprises at least one of magnetizable and magnetic nanoparticles.

10. The process of claim 1, wherein the nanocomposite comprises superparamagnetic nanoparticles.

11. The process of claim 1, wherein the nanocomposite comprises nanoparticles which comprise iron oxide.

12. The process of claim 1, wherein the matrix of the nanocomposite comprises at least one of a polycondensate and a polymer which is based on at least one of one or more alkoxides of elements of the second to fifth main groups, transition metals, and subgroup elements; one or more hydrolyzable compounds of elements of the second to fifth main groups, transition metals, and subgroup elements, which compounds have at least one hydrolyzable group; one or more organic monomers; one or more ormocers; and one or more nanomers.

13. The process of claim 1, wherein the matrix of the nanocomposite comprises at least one of a functional group and a bifunctional molecule.

14. The process of claim 1, wherein the nanocomposite has a surface that comprises a functional group.

15. The process of claim 14, wherein the functional group is provided by a functional silane starting material for preparing the matrix.

16. The process of claim 15, wherein the functional group comprises one or more of an acid, a base, an amino group, a double bond and an epoxide chelating ligand.

17. The process of claim 1, wherein the nanocomposite has a surface that has a biological component coupled thereto.

18. The process of claim 17, wherein the biological component comprises at least one of an antigen, an antibody and a protein.

19. The process of claim 1, wherein the laden nanocomposite is separated from the liquid or gaseous medium by application of a magnetic field.

20. The process of claim 1, wherein the component to be separated comprises a dissolved component.

21. The process of claim 1, wherein the component to be separated comprises a gaseous component.

22. The process of claim 1, wherein the nanoparticles comprise superparamagnetic nanoparticles, the matrix of the nanocomposite comprises at least one of a polycondensate and a polymer which is based on at least one of one or more alkoxides of elements of the second to fifth main groups, transition metals, and subgroup elements; one or more hydrolyzable compounds of elements of the second to fifth main groups, transition metals, and subgroup elements, which compounds have at least one hydrolyzable group; one or more organic monomers; one or more ormocers; and one or more nanomers; and wherein the nanocomposite is in a particulate form and has a particle size of from 50 μm to 300 μm.

23. The process of claim 22, wherein the laden nanocomposite is separated from the liquid or gaseous medium by application of a magnetic field.

24. The process of claim 23, wherein the nanocomposite has a surface that has a biological component coupled thereto.

25. The process of claim 24, wherein the biological component comprises at least one of an antigen, an antibody and a protein.

26. The process of claim 25, wherein the liquid medium comprises an aqueous phase and the particulate nanocomposite is dispersed therein.

27. A process for producing a nanocomposite comprising nanoparticles in a matrix, which process comprises:
(a) dispersing or suspending at least one of magnetizable and magnetic nanoparticles in a liquid matrix-forming material; and
(b) solidifying the liquid matrix-forming material, thereby producing a solid matrix which has the nanoparticles dispersed therein, at least one of the nanoparticles, the solid matrix, and the nanocomposite being functionalized.

28. The process of claim 27, wherein the liquid matrix-forming material is solidified by at least one of a polycondensation, a polymerization and a polyaddition reaction.

29. The process of claim 27, wherein the process further comprises comminuting the nanocomposite.

30. The process of claim 29, wherein the nanocomposite is comminuted to a particle size of from 0.1 μm to 1,000 μm.

31. The process of claim 29, wherein the nanocomposite is comminuted to a particle size of from 1 μm to 500 μm.

32. The process of claim 27, wherein the nanoparticles comprise superparamagnetic nanoparticles.

33. The process of claim 27, wherein the nanoparticles comprise iron oxide.

34. The process of claim 27, wherein the liquid matrix-forming material comprises at least one of one or more alkoxides of elements of the second to fifth main groups, transition metals, and subgroup elements; one or more hydrolyzable compounds of elements of the second to fifth main groups, transition metals, and subgroup elements, which compounds have at least one hydrolyzable group; one or more organic monomers; one or more ormocers; and one or more nanomers.

35. A process for producing a nanocomposite comprising nanoparticles in a matrix, which process comprises:
(a) dispersing or suspending at least one of magnetizable and magnetic nanoparticles in a liquid matrix-forming material to form a dispersion or suspension,
(b) introducing the dispersion or suspension of (a) into a liquid that is immiscible therewith to form an emulsion, and
(c) solidifying the liquid matrix-forming material, thereby producing a solid matrix which has the nanoparticles dispersed therein.

36. The process of claim 35, wherein the liquid matrix-forming material is solidified by at least one of a polycondensation, a polymerization and a polyaddition reaction.

37. The process of claim 36, wherein the liquid matrix-forming material comprises at least one of one or more alkoxides of elements of the second to fifth main groups, transition metals, and subgroup elements; one or more hydrolyzable compounds of elements of the second to fifth main groups, transition metals, and subgroup elements, which compounds have at least one hydrolyzable group; one or more organic monomers; one or more ormocers; and one or more nanomers.

38. The process of claim 35, wherein the nanoparticles comprise superparamagnetic nanoparticles.

39. The process of claim 35, wherein the process further comprises a separation of the nanocomposite from the liquid.

40. The process of claim 39, wherein the separation comprises at least one of a distillation, a centrifugation, a decantation and a filtration operation.

* * * * *